United States Patent [19]

Johnson, Jr. et al.

[11] Patent Number: 4,707,174

[45] Date of Patent: Nov. 17, 1987

[54] FABRICATION OF HIGH-SILICA GLASS ARTICLE

[75] Inventors: David W. Johnson, Jr., Pluckemin; John B. MacChesney, Lebanon; Eliezer M. Rabinovich; Eva M. Vogel, both of Berkeley Heights, all of N.J.

[73] Assignee: American Telephone and Telegraph Company, AT&T Bell Laboratories, Murray Hill, N.J.

[21] Appl. No.: 931,951

[22] Filed: Nov. 20, 1986

Related U.S. Application Data

[63] Continuation of Ser. No. 743,268, Jun. 10, 1985, abandoned, Continuation-in-part of Ser. No. 564,181, Dec. 22, 1983, abandoned.

[51] Int. Cl.$^4$ .............................................. C03B 19/09
[52] U.S. Cl. ...................................... 65/18.1; 65/900; 65/901; 65/DIG. 16
[58] Field of Search ................ 65/3.14, 13, 18.1, 18.2, 65/18.4, 30.13, 30.1, 900, 901, DIG. 16; 501/12; 264/1.5

[56] References Cited

U.S. PATENT DOCUMENTS

| | | | |
|---|---|---|---|
| 3,806,570 | 4/1977 | Flamenbaum et al. | 264/66 |
| 3,954,431 | 5/1976 | Fleming et al. | 65/18 |
| 3,981,707 | 9/1976 | Araujo et al. | 65/30.13 |
| 4,011,006 | 3/1977 | Fleming et al. | 350/96 |
| 4,042,361 | 8/1977 | Bihuniak et al. | 65/18 |
| 4,221,825 | 9/1980 | Guerder et al. | 65/13 |
| 4,224,046 | 9/1980 | Izawa | 65/18.2 |
| 4,264,347 | 4/1981 | Shintani et al. | 65/13 |
| 4,417,910 | 11/1983 | Passaret | 65/18.4 |
| 4,419,115 | 12/1983 | Johnson, Jr. et al. | 501/12 |
| 4,443,239 | 4/1984 | Biswas et al. | 65/13 |

FOREIGN PATENT DOCUMENTS

| | | | |
|---|---|---|---|
| 55-14437 | 11/1980 | Japan | 65/DIG. 16 |
| 56-50136 | 5/1981 | Japan | 65/30.1 |
| 56-125232 | 10/1981 | Japan | 65/DIG. 16 |
| 57-42551 | 3/1982 | Japan | 65/3.14 |
| 60-11244 | 1/1985 | Japan | 65/DIG. 16 |

OTHER PUBLICATIONS

"Continuous Fabrication of High Silica Fiber Preform", 1977, *International Conference on Integrated Optics and Optical Fiber Communication*, T. Izawa et al., 1977, pp. 375–378.

"Gel Method for Making Glass", *Treatise on Materials Science and Technology*, vol. 22, S. Sakka, 1982, pp. 129–167.

*Silicate Science*, vol. VIII, W. Eitel, (1976), paragraph 95, p. 5.

"Process in Silica Fibers with Fluorine Dopant", *Topical Meeting on Optical Fiber Transmission II (Williamsburg, Va.)*, 1977, K. Rau et al., pp. TUC4-1-TUC4-4.

"Transmission Characteristics of VAD Fibers Using a Multiple Burner with Single Source Gas Nozzle", *Fiber and Integrated Optics*, vol. 4 (2), K. Ishida et al., (1982), pp. 191–202.

*Proceedings of the Second European Conference on Optical Fiber Communications, IEE*, pp. 59–61, Paris, France, (1976).

*Primary Examiner*—S. Leon Bashore
*Assistant Examiner*—Michael K. Boyer
*Attorney, Agent, or Firm*—Eugen E. Pacher

[57] ABSTRACT

Incorporation of fluorine into a porous silica body, such as an unsintered body produced by a sol-gel method, by VAD or OVPO, reduces or eliminates bubble or pore formation upon re-heating of the glass formed by sintering of the porous material. Effective fluorine concentrations are between 0.01 and 5% by weight. The invention can be used advantageously in producing preforms and optical fiber.

13 Claims, No Drawings

FABRICATION OF HIGH-SILICA GLASS ARTICLE

This application is a continuation of application Ser. No. 743,268, filed June 10, 1985, which was a continuation-in-part of application Ser. No. 564,181, filed Dec. 22, 1983 both now abandoned.

FIELD OF THE INVENTION

This invention pertains to methods for producing high-silica glass and high-silica glass articles. In particular, it pertains to methods resulting in formation of a porous high-silica intermediate body, e.g., the solgel methd.

BACKGROUND OF THE INVENTION

High-silica glasses have wide commercial application, in part because of their refractory properties, low thermal expansion, high thermal shock resistance, good chemical resistance, and good dielectric insulating properties when low in alkali-oxides. Recently, very pure high-silica glasses have been fabricated, and such glasses have been successfully applied to produce extremely low-loss optical fibers for communication systems.

High-silica glasses are made primarily by melting of appropriate starting materials, by the sol-gel method, or by depositing the glassy product of appropriate gas phase reactions. This application is concerned only with the second method and a subgroup of the third method, the subgroup comprising the so-called Vertical Axial Deposition (VAD) method, and the Outside Vapor Phase Oxidation (OVPO) method. The glass-forming methods of concern in this application have the common feature that a porous intermediate body exists at some point during glass manufacture, and that this intermediate body is at some later stage heat treated to result in a dense glass body. The glass body is then typically re-heated to at least a sintering temperature, and may be subjected to a shape-changing treatment, e.g., fiber drawing. Such heating treatment of the glass body will be referred to herein as "re-heating".

Although the fusion method of glass fabrication is probably the most widely used method, the sol-gel method of producing high-silica glasses can actually have significant advantages over the former. See, for instance, commonly assigned U.S. Pat. No. 4,419,115, incorporated herein by reference. For a description of the VAD and the OVPO methods, see T. Izawa et al, 1977 *International Conference on Integrated Optics and Optical Fiber Communication*, (Tokyo, Japan), pp. 375-378; and U.S. Pat. No. 3,806,570 issued to J. S. Flamenbaum et al, respectively.

Several variants of the sol-gel method for forming high-silica glass are known in the art. Among these are processes comprising hydrolysis and polymerization of a metal alkoxide, and processes that use particulates such as fumed silica in sol-formation. Alkoxide processes are described, for instance, in the chapter by S. Sakka in *Treatise on Materials Science and Technology*, Vol. 22, M. Tomozawa and R. H. Doremus, editors, Academic Press, 1982, pp. 129-167. For an example of the particulate method, see, for instance, U.S. Pat. No. 4,042,361, which discloses a method of densifying fumed silica involving drying a flowable sol of silicate to form a fragmented solid which is then calcined, milled to provide a slip for casting silica articles which are then fused by heating to temperatures above the liquidus.

Fabrication of high-silica glass articles often comprises a manufacturing step in which the prepared glass is heated to a temperature above the softening temperature. For instance, optical fiber is typically produced by drawing from a glass body, generally called a preform, the drawing typically requiring heating part of the preform to a temperature of the order of 2200° C. It has been observed in the prior art that glass produced by a sol-gel method is subject to bubble formation or reboil, also sometimes called bloating, during such high temperature treatment. Bubble or pore formation can also occur in VAD and OVPO-produced glass. See, for instance, K. Ishida et al, *Fiber and Integrated Optics*, Vol. 4, No. 2, Crane, Russak & Co. (1982), pp. 191-202.

Bubble formation is a highly undesirable phenomenon that typically requires rejection of affected articles. For instance, bubbles in such articles as optical fiber, lenses, prisms, or other optical elements result in light scattering that makes such articles generally unacceptable.

U.S. Pat. Nos. 3,954,431 and 4,011,006, co-assigned with this, teach, inter alia, that the inclusion of small quantities of $GeO_2$ in borosilicate glass suppresses bubble formation. It is also known that execution of an exacting heating routine during sintering, or sintering in a He-atmosphere, can reduce bubble formation during subsequent higher temperature manufacturing steps.

However, due to the economic potential of high quality sol-gel, VAD, and OVPO high-silica glass, the availability of a broadly applicable, simple, and reliable method for eliminating bubble formation would be highly desirable. This application discloses such a method.

The prior art knows many elements and compounds that can be incorporated into high-silica glass to produce changes in the physical characteristics of the glass. For instance, germanium is an important dopant in glass for optical fibers, since it results in an increase of the refractive index of silica without causing optical absorption at wavelengths of current interest. Another well-known dopant is fluorine, which lowers the refractive index of silica, in addition to markedly decreasing its viscosity and lowering its glass transition temperature. See, for instance, W. Eitel, *Silicate Sciences*, Vol. VIII, paragraph 95, page 54, Academic Press, 1976; K. Abe, *Proceedings of the Second European Conference on Optical Fiber Communications*, IEE, 59-61, Paris, France, 1976; and K. Rau et al, *Topical Meeting on Optical Fiber Transmission II*, Williamsburg (1977), pp. TUC 4-1 to TUC 4-4.

SUMMARY OF THE INVENTION

We have invented a method for reducing or preventing bubble formation during re-heating of high-silica glass formed from a porous high-silica intermediary. The inventive method comprises forming a body comprising porous silica and heating at least part of the porous silica-comprising body to a sintering temperature, thereby producing a body comprising high-silica glass. The method further comprises introducing, prior to completion of the glass-producing heat treatment, fluorine into at least a part of the silica-comprising body such that the fluorine concentration in the silica glass produced by the heat treatment is at least about 0.01% b.w.

The fluorine concentration typically is less than about 5% by weight (b.w.), and preferably is between about 0.1% and 2% b.w. The fluorine is introduced prior to or during sintering of the porous silica-comprising body, e.g., in the sol-gel method during gel formation, by impregnation of the undried gel, by impregnation of the dried, i.e., unsintered or partially sintered gel body, or during the sintering treatment; or in VAD or OVPO during sintering. The fluorine can be in elemental form or be derived from appropriate fluorine containing compounds. The compounds can be gaseous, liquid, or solid, in the latter case they are preferably soluble in, e.g., water or alcohol.

In a high-silica glass article according to the invention an effective level of fluorine is present, (at least prior to re-heating,) throughout the part of the glass body that is to be re-heated. For instance, in a preform (or optical fiber) according to the invention an effective level of fluorine is present both in the cladding material and in the core material. This distinguishes inventive preforms (and fiber) from the prior art, in which fluorine is commonly used to depress the clad refractive index, but is typically not incorporated into the fiber core.

"Articles" according to the invention are intended to include both final products such as optical fibers and intermediate glass bodies such as consolidated preforms.

DETAILED DESCRIPTION

As was mentioned above, the sol-gel method for producing high silica glass, i.e., glass comprising more than about 50% b.w. $SiO_2$, typically more than about 80% b.w., potentially has advantages over other common production methods. For instance, it is often easier to produce glass bodies of high purity by the sol-gel process than by melting, since the porous nature of the gel body facilitates purification by contact with appropriate gaseous reactants, e.g., chlorine treatment to remove $OH^-$. Conversely, the sol-gel method is also well suited to producing doped (uniformly or nonuniformly) glass bodies. An example of a nonuniformly doped body is an optical fiber preform.

Since very high purity and nonuniform doping typically cannot be achieved by the melt process of glass making, bodies having these properties are presently typically produced by processes involving deposition of glassy material formed in an appropriate gas phase reaction. Although these processes (e.g., OVPO, VAD, etc.) are by now highly refined, they are typically relatively slow and thus expensive. The sol-gel process has the potential of producing glass bodies of similar quality as those produced by deposition, but at substantially lower cost.

A drawback of prior art sol-gel methods is the bubble formation that is often observed on re-heating the consolidated glass, i.e., heating the glass at least to, but typically substantially above, the sintering temperature. Such re-heating occurs, for instance, during fiber drawing from a preform. Although the prior art knows some techniques for reducing or eliminating this bubbling, it is an object of this invention to provide an effective means for achieving this end that not only is compatible with existing sol-gel techniques but can lead to simpler and more economical treatment. It is a further object of the invention to reduce or prevent the pore formation that can occur on re-heating of VAD- or OVPO-formed glass. These and other objectives are achieved by introducing an effective amount of fluorine into the glass. Such treatment not only reduces or eliminates bubbling but also reduces glass viscosity, thus making possible processing at lower temperatures, and aids in sintering the glass. Fluorine is also an index-lowering glass dopant that is useful in forming optical cladding material for optical fiber guide. Furthermore, introduction of fluorine assists in the removal of residual $OH^-$ groups from the silica.

The invention can be practiced in conjunction with any of the known methods for forming porous high-silica glass bodies, e.g., the sol-gel method, VAD, or OVPO, but the scope of the invention is not intended to be limited to the presently known methods. Known sol-gel methods are, for instance, the colloidal gel method, and the alkoxide hydrolysis method, as described, for instance, in U.S. Pat. No. 4,419,115, and the previously cited S. Sakka article, respectively.

The fluorine can be introduced at any convenient point of the process prior to the re-heating step that could, in prior art bodies, produce bubbling. Typically, the introduction occurs prior to completion of sintering of the glass, for instance, during gel preparation, after formation of the gel body (e.g., by impregnation of the undried body), after drying of the gel body (e.g., by impregnation of the unsintered or partially sintered body), or by exposure to gaseous reactants at temperatures below those required to sinter the dried gel, or during sintering.

A convenient method for producing a fluorine-containing gel is the introduction of a liquid or soluble solid (soluble in, e.g., water or alcohol) fluorine compound into the sol or gel. Exemplary compounds therefore are HF, $NH_4F$, and fluorinated hydrocarbons, e.g., tetraethyl ammonium fluoride hydrate.

Introduction of fluorine into an undried gel body, i.e., fluorine impregnation, can be by penetration of fluorine-containing liquid into the body. In addition to the categories of compounds mentioned in the previous paragraph, compounds soluble in chloroform or other liquid hydrocarbon can be advantageously used.

Into dried gel bodies, i.e., unsintered or partially sintered bodies, fluorine can advantageously be introduced by, in addition to the methods described above, contacting the body with fluorine or a gaseous fluorine-containing compound. The same approach can be applied to the introduction of fluorine during heat treating or sintering of porous glass bodies produced by non-gel methods (e.g., VAD or OVPO). Exemplary compounds are fluorocarbons such as FREON, $CF_4$, $CF_{4-y}Cl_y$, $(0 \leq y \leq 3)$ etc., fluorinated hydrocarbons, HF, $NH_4F$, and other inorganic fluorides such as $SiF_4$, $GeF_4$, $BF_3$, $PF_3$, $PF_5$. The atmosphere typically consists of one or more fluorine compounds, in addition to other gases, e.g., diluents such as He, or reactants such as chlorine.

The fluorine concentration need not be uniform throughout the body formed according to the invention. Only parts of the body that are to be subjected to reheating require the presence of fluorine, and furthermore, the concentration even in the fluorine-containing parts need not be uniform, provided, at the start of re-heating, an effective amount of fluorine (more than about 0.01%, typically more than 0.1% b.w.) is present everywhere therein. At least some fluorine typically is lost during heat treating, e.g., sintering or re-heating. An upper limit of fluorine content in high silica glass is about 5% b.w., typically due to the limited solubility of $F_2$ in high $SiO_2$ glass, as well as the thermodynamically favored reaction between $SiO_2$ and $F_2$ to form gaseous $SiF_4$ and $O_2$. These limits refer to fluorine incorporated into the glass prior to re-heating. A nonuniform fluorine distribution ca produce a nonuniform refractive index distribution, and this may be used, for instance, in optical fiber manufacture.

We have discovered that the inventive method for preventing bubbling at reheating particularly effective if the porous body had been contacted with chlorine, or a chlorine compound, prior to, or during, sintering. As is well known, sintering a porous silica body in a $Cl_2$-containing atmosphere results in the removal of OH from the body, and this is widely practiced in conjunction with VAD, OVPO, or sol-gel methods. It is, therefore, preferred to practice the inventive method on a high-silica body that is contacted, prior to completion of sintering, with chlorine or with a chlorine-containing compound. Typically, such contacting occurs during a heat treatment prior to sintering, or during sintering. As was described above, fluorine compounds can be introduced into the material of the porous body, or into the porous body, at any process step prior to completion of sintering.

In the following examples, processing similar to that as described in U.S. Pat. No. 4,419,115 was generally used.

Example 1: Fumed silica (grade M-5 from Cabot Corp.) was mixed with water (40:100 b.w.), the thus formed sol was dried at 150° C. and heat treated at about 800° C. 150 gms of the heat treated $SiO_2$ was again mixed with 270 gms of water and blended to form a second sol comprising aggregates of the original fumed silica particles. About 400 gm of the second sol was transferred to a borosilicate jar containing about 600 gm of $SiO_2$ cylinders ($\sim\frac{1}{2}$ inch diameter, $\sim\frac{1}{2}$ inch long) and rolled on a mill for 5 hours, after addition of about 1% (b.w., based on the weight of the $SiO_2$ in the sol) of HF solution (about 50% HF in $H_2O$) to the contents of the jar. The milled sol was then cast into 11 mm ID $SiO_2$ tubes, allowed to gel overnight, the resulting gel rods were removed from the molds, dried, heat treated at 1000° C. in He+3% $Cl_2$ to remove bound water, and sintered at about 1400° C. in He. This procedure resulted in transparent glass rods containing an estimated amount greater than 0.1% b.w. of fluorine distributed throughout the body. Heating these rods to fiber drawing temperatures (>2000° C.) did not produce reboil. Identically prepared rods not containing fluorine showed serious reboil at these temperatures. Unless otherwise noted, in the following examples, processing substantially as described in Example 1 was used. In particular, the porous bodies were generally heat treated in a $Cl_2$ atmosphere prior to consolidation.

Example 2: 150 gm of once-dispersed and heat treated $SiO_2$, produced as in Example 1, was mixed with 203.5 gm $H_2O$ and 59.2 gm of a 4.5% b.w. solution of $H_2BO_3$ in $H_2O$, blended, transferred to a mill jar, 1.5 gm of HF added, milled for 19 hours, and cast into a concentric cylinder mold designed to yield a sintered gel glass tube of about 19 mm I.D., 25 mm O.D. After gelling, the body was removed, dried, and sintered. The resulting tube did not exhibit reboil at fiber drawing temperatures. The presence of HF also accelerated the gelling of the sol.

Example 3: The same as Example 2, except that the HF was added after $5\frac{1}{4}$ hours of milling.

Example 4: 2% b.w. fluorine and 4.8% $B_2O_3$ were added to a gel glass batch by blending together 100 gm once dispersed and dried fused $SiO_2$, 188.5 gm of 4.5% b.w. $H_3BO_3$ solution and 4 gm of HF.

Example 5: Colloidal $SiO_2$ was produced by hydrolyzing tetraethylorthosilicate (TEOS), adding water thereto (150:220 gm), and milling for 18 hours. The resulting sol had low viscosity. 1.5 gm of HF was added to the mill jar, and milling continued for $1\frac{1}{2}$ hours. The cast sol could be gelled overnight. Glass was produced from the gel body substantially as described.

Example 6: 90 gm of previously dispersed and dried colloidal silica (prepared substantially as described in Example 1) are mixed in a blender with 132 gm of distilled $H_2O$ in which 5.4 gm of $NH_4F$ had previously been dissolved, resulting in a gel containing 3% b.w. of fluorine. Glass was produced from the gel substantially as described.

Example 7: A dried porous glass body was prepared substantially as described. The body was impregnated, prior to firing, by immersion in an aqueous 5.7% solution of $NH_4F$, and re-dried. This resulted in introduction of about 3% b.w. of F into the resulting dried gel.

Example 8: The procedure was substantially as in Example 7, but the dried glass body was, prior to impregnation, partially sintered at 1000° C.

Example 9: A porous glass body was prepared substantially as described, and fired in a furnace in the presence of several grams of $NH_4F$ powder, which produces a fluorine-containing atmosphere in the furnace.

Example 10: Fluorine-free glass bodies were fired together with fluorine-containing glass bodies, produced substantially as in Example 6, the latter providing the fluorine-containing atmosphere for all the bodies.

Example 11: 1.8 gm of $NH_4F$ were dissolved in the water/ammonia mixture (pH=11) prepared for hydrolysis of 312 gm (1.5 moles) of TEOS to provide a 1% b.w. fluorine admixture to the $SiO_2$ powder resulting from the hydrolysis. This powder was redispersed and a sintered glass body produced therefrom by a procedure substantially as described above.

The bodies of Examples 3–11 showed substantially no evidence of reboil upon heating to fiber drawing temperatures.

Example 12: A porous glass body was produced by a method substantially as described. The body was lowered into a vertical furnace, heat treated (soaked) therein, raised, then lowered again for sintering. The heating program and the atmosphere (i.e., gas flow rates) in the furnace, for the inventive body, are given in Table I below under "Experiment 1". Also given in Table I are the data for a similarly produced body into which no fluorine was incorporated (Experiment 2). The "lowering" and "raising" times refer to the time taken to lower the body from the 100° C. zone to the hot zone, or raise the body from the hot zone to the 100° C. zone, respectively.

TABLE I

| Lowering Raising (hr) | Soak (hr) | Atmosphere | (cc/min) | Temp. (°C.) |
|---|---|---|---|---|
| Exp. 1 | | | | |
| Lowered | | He | 932 | 850 |
| $\frac{1}{4}$ | | $Cl_2$ | 43 | |
| | 16 | He | 932 | 850 |
| | | $Cl_2$ | 43 | |
| | 2 | He | 932 | 850 |
| | | $SiF_4$ | 23 | |
| raised | | He | 932 | 850 |

TABLE I-continued

| Lowering Raising (hr) | Soak (hr) | Atmosphere | (cc/min) | Temp. (°C.) |
|---|---|---|---|---|
| ¼ | | SiF$_4$ | 23 | |
| lowered 2 | | He | 932 | 1400 |
| | | SiF$_4$ | 23 | |
| Exp. 2 | | | | |
| lowered ¼ | | He | 932 | 850 |
| | | Cl$_2$ | 43 | |
| | 16 | He | 932 | 850 |
| | | Cl$_2$ | 43 | |
| | 1½ | He | 1864 | 850 |
| raised ¼ | | He | 1864 | 850 |
| lowered 2 | | He | 1864 | 1400° C. |

In Experiment 1, where SiF$_4$ was used to introduce fluorine into the unsintered glass, no reboil was observed upon heating to 2200° C., whereas in Experiment 2 reboil occurred under these conditions.

Example 13: A glass body was prepared substantially as in Example 12, Exp. 1, but with FREON 12 (Cl$_2$F$_2$) used instead of SiF$_4$. No evidence of reboil was found upon heating of 2200° C.

Example 14: A porous silica body is produced by VAD substantially as described by K. Ishida et al (op. cit.), and sintered at 1500° C. in He/SiF$_4$ atmosphere (97.6:2.4 by volume) for 2 hours. The resulting dense glass body is heated to 2200° C. No bubble formation is observed.

What is claimed is:

1. Method of producing an optical fiber comprising a core and a cladding surrounding the core, the core and the cladding consisting of high-silica glass, the method comprising making a high-silica glass body having a predetermined refractive index profile, with a center region of relatively high refractive index and a peripheral region of relatively low refractive index surrounding the center region, the glass body to be referred to as the preform, heating at least a part of the preform to a temperature above a sintering temperature, and drawing the optical fiber from the heated part of the preform, with the fiber core and cladding derived from the center region and peripheral region of the preform, respectively; wherein the preform is made by a process that comprises
   (a) making a porous high-silica body by a sol-gel process, the porous body having an inner portion and an outer portion;
   (b) drying the porous body including heat treatment in an atmosphere comprising chlorine to remove bound water; and
   (c) sintering the porous body at the sintering temperature such that the porous body is transformed into the preform, the center and peripheral regions of the preform derived, respectively, from the inner and outer portion of the porous body;
the method further comprises
   (d) causing to be present, prior to completion of step (c), in both the inner and the outer portion of the porous body, a fluorine concentration that is effective to essentially prevent the evolution of bubbles in the heated part of the preform during the heating and fiber drawing, such that the core and the cladding of the optical fiber are essentially free of bubbles.

2. Method of claim 1, wherein step (a) comprises forming a gel tube and filling the interior of the gel tube with a second gel.

3. Method of claim 1, wherein the fluorine concentration is at least 0.01% by weight everywhere in the porous body.

4. Method of claim 1, wherein at least part of one or both of steps (b) and (c) is carried out in an atmosphere consisting essentially of about 97% He and 3% chlorine.

5. Method of claim 1, wherein at least part of step (c) is carried out in an atmosphere that comprises chlorine and fluorine.

6. Method of claim 1, further comprising contacting, at least during part of step (c), the porous body with chlorine or a chlorine-containing compound such that OH is removed from the porous body.

7. Method of claim 1, wherein at least some of the fluorine is caused to be present in the porous body by introducing fluorine into the porous body prior to sintering.

8. Method of claim 1, wherein at least some of the fluorine is caused to be present in the porous body by contacting the dried porous body with a fluorine-containing atmosphere.

9. Method of claim 1, wherein step (d) comprises contacting the porous body with at least one compound selected from the group consisting of the fluorinated hydrocarbon, CF$_{4-y}$Cl$_y$ ($0 \leq y \leq 3$), F$_2$ and the inorganic fluorides.

10. Method of claim 9, wherein the fluorinated hydrocarbon is tetraethylammonium fluoride hydrate.

11. Method of claim 9, wherein the inorganic fluoride is selected from the group consisting of HF, SiF$_4$, NH$_4$F, GeF$_4$, BF$_3$, PF$_3$, and PF$_5$.

12. Method of claim 9, wherein $y=2$.

13. Method of claim 1, wherein the temperature above the sintering temperature is at least about 2000° C.

* * * * *